United States Patent [19]
Arnoux et al.

[11] Patent Number: 4,708,422
[45] Date of Patent: Nov. 24, 1987

[54] MULTI-WAVELENGTH LIGHT EMITTING AND RECEIVING APPARATUS FOR MONITORING CONNECTIONS BY OPTICAL FIBERS

[75] Inventors: Daniel Arnoux, Portsmouth, N.H.; Claude Genter; Christian Anton, both of Paris, France

[73] Assignee: Societe Chauvin Arnoux, Paris, France

[21] Appl. No.: 774,715

[22] Filed: Sep. 6, 1985

[30] Foreign Application Priority Data

Jan. 14, 1985 [FR] France .................. 85 00424

[51] Int. Cl.⁴ .................. G02B 6/42; G01N 21/88
[52] U.S. Cl. .................. 350/96.15; 356/73.1
[58] Field of Search .................. 250/227; 350/96.15; 356/73.1

[56] References Cited
U.S. PATENT DOCUMENTS
4,468,117  8/1984  Hartouni et al. .................. 356/73.1

Primary Examiner—Eugene R. Laroche
Assistant Examiner—Steven J. Mottola
Attorney, Agent, or Firm—Wolf, Greenfield & Sacks

[57] ABSTRACT

A multi-wavelength light emitting and receiving apparatus for monitoring connections by optical fibers comprising a case, an emission section, a reception section, a keyboard for selecting operating modes and measurement scales, a display arrangement, a processing unit including a microprocessor connected to the emission section, the reception section, the keyboard and the display arrangement, and a feed. The emission and reception sections are mounted in a drawer provided with a connector that can be inserted into a complementary connector provided in the case, this latter containing the keyboard, the display arrangement, the processing unit, and the feed. It also contains at least one more emitting/receiving drawer equipped with a connector that can be inserted in the said complementary connector of the case and contains another controlled current source, another light-emitting diode having an emission wave-length different from that of the first light-emitting diode and connected to the other controlled current source, another photoreceiver having a spectral window covering that of the other light-emitting diode and another amplifier connected to the outlet of the other photoreceiver. Each amplifier has a gain adapted to the response of the photoreceiver and associated with the wavelength emitted by the emitting diode situated in the corresponding drawer, such that at identical levels of light powers respectively emitted by the emitting diodes and respectively received by the photoreceivers the amplifiers deliver output signals having the same levels.

8 Claims, 6 Drawing Figures

MULTI-WAVELENGTH LIGHT EMITTING AND RECEIVING APPARATUS FOR MONITORING CONNECTIONS BY OPTICAL FIBERS

BRIEF DESCRIPTION OF THE INVENTION

The present invention concerns an apparatus that emits and receives multi-wavelength light for monitoring connections by optical fibers, of the type comprised of a case, an emission section containing a controlled current source and at least one light-emitting diode connected to the controlled current source, a receiving section involving a photoreceptor, having a spectral window covering that of the light-emitting diode, and an amplifier connected to the outlet of the photoreceptor, a keyboard for selecting the operating modes and the measuring scales, a display arrangement, a microprocessor unit connected to the controlled current source of the emission section, the amplifier of the receiving section, the keyboard and the display arrangement, and a feed capable of furnishing the continuous voltages required for the operation of the apparatus.

Light emitting and receiving apparatuses are already known that contain one or two light-emitting diodes, e.g., the apparatuses of the ANDO Company, Models AQ1006/1007, or the apparatuses of the ANRITSU Company, Models MS92A/MS93A/MS95A. These familiar devices operate on only one or two fixed wavelengths. In order to be able to work on a broad spectral window, it would then be necessary to have practically as many devices as the number of working wavelengths.

Light emitting and receiving apparatuses have already been proposed for remedying this shortcoming: for example, the apparatuses of the PHOTODYNE INC. Company, Models 2200 XF and 2250 XF, which in order to cover a given spectral range utilize several emitting diodes that are mounted in cases capable of being selectively series-mounted in a connector provided on one face of the case of the apparatus. The diodes are fed by a constant current source situated in the case of the apparatus, which also contains a broad spectral window (400–1150 nm) for the 2200 XF Model and 800–1800 nm for the 2250 XF Model. There too, one must have two basic apparatuses to cover the entire range of wavelengths from 400 to 1800 nm. Furthermore, to be able to cover a spectral window from 800 to 1800 nm, the 2250 XF model utilizes a germanium photoreceiver which, even when it is placed in a case cooled by the Peltier effect, has a distinctly lower sensitivity than that of a silicon photoreceiver in the spectral domain from 800 to 1000 nm. In other words, in the receiving mode, enlargement of the spectral window is obtained at the expense of the sensitivity in the wavelength domain from 800 to 1000 nm.

Besides, since the photoreceivers currently available on the market have a response curve that is not prefectly planar, to obtain a measurement signal whose value is practically independent of the working wavelength, one must either provide expensive filters adapted to each working wavelength or apply weighting factors to the measurement signals, whose values are a function of the wavelengths used and which are stored in a memory of the processing unit and selected for each measurement as a function of the emission wavelength chosen. Since the photoreceptors currently available on the market have characteristics that present a great dispersion for the same photoreceptor model, the weighting factors have to be determined individually for each photoreceptor, which necessitates a calibration of each apparatus for storing the weighting factors in the memory. If the photoreceiver should break down, it is thus not sufficient to replace it with a new photoreceiver; rather, the apparatus must also be recalibrated completely with the new photoreceiver.

In addition, although the emitting diodes are fed with a constant stabilized current, this does not in itself guarantee the stability of the level of the light power emitted. The latter can in effect vary due to the self-heating of the emitting diode and possibly the ambient temperature. Besides the temperature deviation of the light-emitting diode, there are other sources of error that affect the light power level actually emitted in the optical fiber to be tested. These error sources are, for example: deviation in the emitting diode due to its aging, losses in the connector between the fiber to be tested and the emitting diode or the photoreceiver, etc . . . It is thus desirable to be able to compensate for the temperature variation and the deviation due to the aging of the emitting diodes, as well as the above losses, which is a problem when several emitting diodes can be selectively connected to the apparatus, since some of the error sources reside in the emitting diodes themselves.

Finally, if one wishes to perform measurements of the linearity, sensitivity threshold and saturation level of a receiver, it is necessary, for the different emission wavelengths, that the emitting and receiving apparatus be capable of delivering a light power with a value that is perfectly stable and controlled and can be modified at will.

The present invention thus proposes to furnish a multi-wavelength light emitting and receiving apparatus for monitoring connections by optical fibers, which is capable of working in a broad range of wavelengths and in which the photoreceiver has an optimal sensitivity for the emission wavelength chosen.

Another purpose of the present invention is to furnish a light emitting and receiving apparatus of the above type, in which it is not necessary to store weighting factors corresponding to the working wavelengths in the memory of the processing unit, and which does not have to be completely recalibrated after the replacement of a defective photodetector with a new one.

The present invention also proposes to furnish a light emitting and receiving apparatus of the above type, capable of emitting a light power whose value is perfectly controlled and stable in time and with variations in temperature, whatever the emission wavelength chosen.

The present invention also proposes to furnish a light emitting and receiving apparatus in which the light power value emitted can be modified at will between 0 and a maximum value, whatever the emission wavelength chosen.

For this purpose, the apparatus according to the present invention is characterized in that the light-emitting diode, the controlled current source, the photoreceiver and the amplifier are mounted in a drawer provided with a connector capable of being inserted in a complementary connector provided in the case, the latter containing the keyboard, the display device, the processing and feed unit, in that it is comprised of at least one more drawer equipped with a connector that can be inserted in the said complementary connector of the case and contains another controlled current source, another light-emitting diode having an emission wavelength different from that of the first light-emitting diode and connected to the other controlled current source, another photoreceiver having a spectral window covering that of the other light-emitting diode and another amplifier connected to the outlet of the other photoreceiver, and in that each amplifier has a gain adapted to the response of the photoreceiver and associated with the wavelength emitted by the emitting diode situated in the corresponding drawer, such that at identical levels of light powers respectively emitted by the emitting diodes and respectively received by the photoreceivers the amplifiers deliver output signals having the same levels.

Thus, a photoreceptor is associated with each light-emitting diode so that the photoreceiver can be chosen so as to have the optimal sensitivity for the wavelength of the emitting diode to which it is associated. In addition, since each photoreceiver operates at a single wavelength, that of the emitting diode associated with it, and since each amplifier has a gain adapted to the response of the photoreceiver associated with it, it is no longer necessary to store the weighting factors in a memory of the processing unit and, if a defective photodetector should be replaced with a new one, it is sufficient to adjust the gain of the amplifier associated with it, without having to recalibrate the apparatus completely.

Furthermore, since each light-emitting diode is associated with its own controlled current source, the deviations due to temperature and aging and specific to each emitting diode can be readily compensated, as will be demonstrated in detail below.

Other characteristics and advantages of the present invention will become evident during the following description of one embodiment of the light emitting and receiving apparatus, given with reference to the attached drawings, in which.

Figure 1:
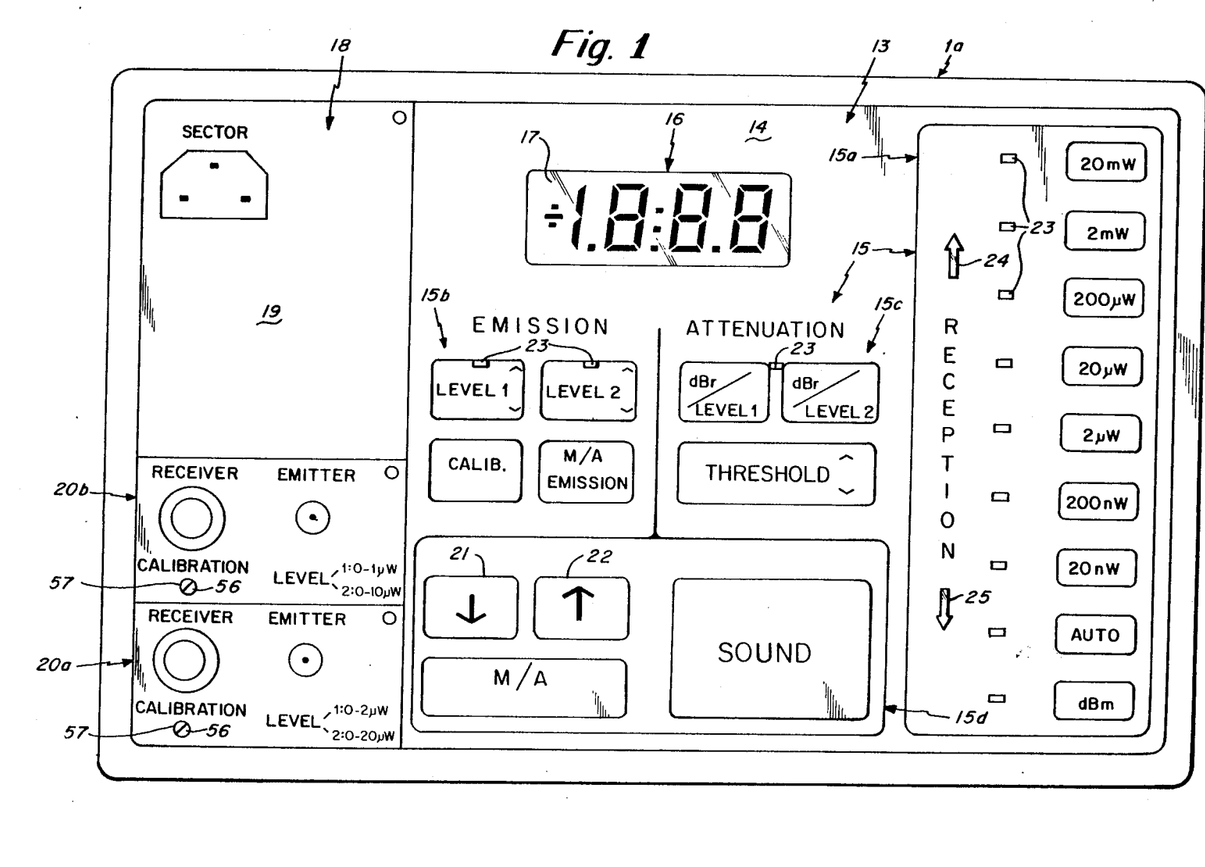
FIG. 1 shows the front face of the case of the light emitting and receiving apparatus of the present invention.
Figure 2:
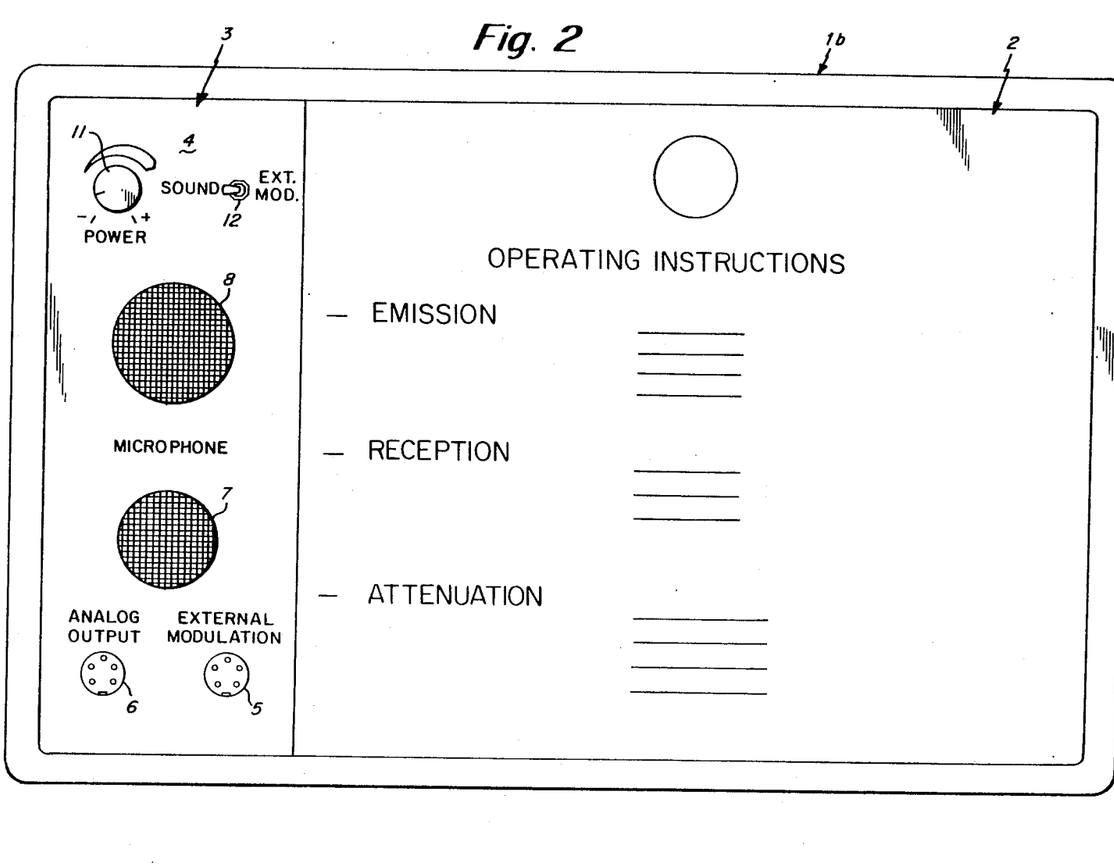
FIG. 2 shows the inside face of the cover of the case of the apparatus of FIG. 1.

The case of the light emitting and receiving apparatus of the present invention can be realized in the form of a case comprised of a lower shell 1a and an upper shell or cover 1b hinged on one edge of the lower shell. FIGS. 1 and 2 respectively show the upper face of the lower shell 1a and the inner face of the cover 1b after the case is opened.

The cover 1b contains a first compartment 2 containing the operating instructions of the apparatus and various accessories, and a second compartment 3, the front face 4 of which carries two normalized female sockets 5 and 6, one designed to receive a low-frequency signal of external modulation, the other furnishing an analog output signal proportional to the signal received by the apparatus, a microphone 7 and a loudspeaker 8 for emitting and receiving sound signals, whose power in the receiving mode can be regulated by a potentiometer 9 (FIG. 3) controlled by a button 11, and a two-position commutator 12 that permits selecting the "sound" function or the "external modulation" function in the emission mode.

The lower shell 1a of the case contains a first compartment 13 whose front face 14 carries a control keyboard 15 and has a window 16 that allows a numerical display 17 by transparence, such as a liquid-crystal display for example, and a second compartment 18 that contains a first removable drawer 19 in which the continuous current supply of the apparatus is located, and two other removable drawers 20a and 20b of identical construction, which will be described in detail below. The drawer 19, for example, can contain batteries and a battery charger, or also a continuous current supply device operating on the sector.

The keyboard 15 has various keys that permit controlling the function of the apparatus and selecting the various operating modes and measurement scales. It is divided into four parts, a part 15a that regroups the reception controls, i.e., seven keys for manually selecting the power ranges (20 mW to 20 nW), a key for automatically selecting the power scales (AUTO) and one key (dBm) for the measurements in dBm, one part 15b that regroups the emission controls, i.e., two keys for selecting the emission power levels (LEVEL 1 and LEVEL 2), a calibration key (CALIB.) and a key for starting or stopping the emission (M/A EMISSION), a part 15c that regroups the controls for an attenuation measurement, i.e., two keys (dBr/LEVEL 1 and dBr/LEVEL 2) that fix the emission level and a sound alarm release threshold key (THRESHOLD), and a part 15d that regroups the general controls, i.e., a start/stop key (M/A), a key for activating the sound function (SOUND) and two keys 21 and 22 that respectively permit decrementing and incrementing the emission level or the sound alarm release threshold depending on whether the apparatus is operating in emission mode or in attenuation measure mode, the selected value of the emission level or of the sound alarm release threshold being displayed by the display 17. The keyboard 15 also contains a certain number of electroluminescent diodes or other luminous indicators such as 23, which are lit up to indicate the function or the power range selected, as well as two luminous arrows 24 and 25 which advise the user that he has to change the range when one of them lights up in the reception mode with manual selection of the power range.

Figure 3:
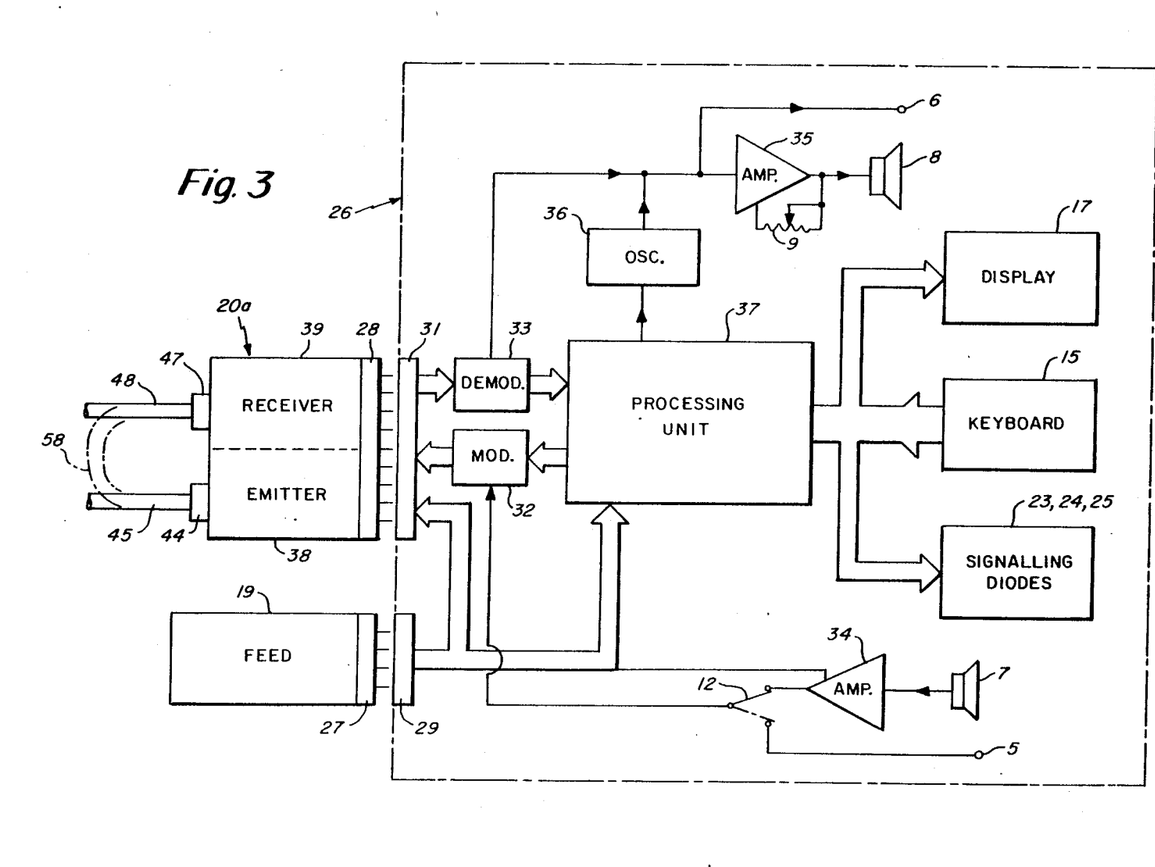
FIG. 3 is a block diagram of the general organization of the apparatus of FIGS. 1 and 2.

The block drawing of FIG. 3 shows the general organization of the emitting and receiving apparatus of the present invention. As shown in FIG. 3, the apparatus is comprised of a base part 26 to which the "feed" drawer 19 and the "emitter/receiver" drawer 20a (or 20b) are electrically connected respectively by connectors 27 and 28, which can be inserted respectively in the complementary connectors 29 and 31 of the base part 26.

The other "emitter/receiver" drawer 20b is simply engaged in the compartment 18 of the housing and left waiting, without being connected electrically to the base part 26. However, the drawer 20b could also be connected electrically to the base part 26 by a connector similar to the connector 31, but in this case a commutator should be provided for selectively placing in service the drawer 20a or drawer 20b.

In addition to the microphone 7, the loudspeaker 8, the potentiometer 9, the commutator 12, the keyboard 15, the display 17 and the signalling diodes 23, 24 and 25, the base part 26 also contains a modulator 32, a demodulator 33, a low-frequency amplifier 34 whose input is connected to the microphone 7 and whose output is connected through the commutator 12 to a modulation input of the modulator 32, a low-frequency amplifier 35 whose input is connected to a modulation signal output of the demodulator 33 and whose output is connected to the microphone 8, a low-frequency oscillator 36 whose output is connected to the input of the amplifier 35 for emitting a sound alarm signal in attenuation measure mode, and a unit for processing by the microprocessor 37 which, in response to the control signals furnished by the keyboard 15, governs the function of the display 17, signallization diodes 23, 24 and 25 and the oscillator 36, furnishes a control voltage $v_c$ to the modulator 32 in emission mode, in attenuation measure mode and in sound mode, and processes the signal furnished by the demodulator 33 in the reception mode or in the attenuation measure mode in order to display, on display 17, the value of the power or attenuation of the luminous signal received by the reception part of the drawer 20a (or 20b). A large portion of the above-described elements of the base part 26 of the emitting and receiving apparatus of the present invention is quite conventional and to the extend that these elements are not directly involved in the present invention, they will not be described in detail.

Figure 4:
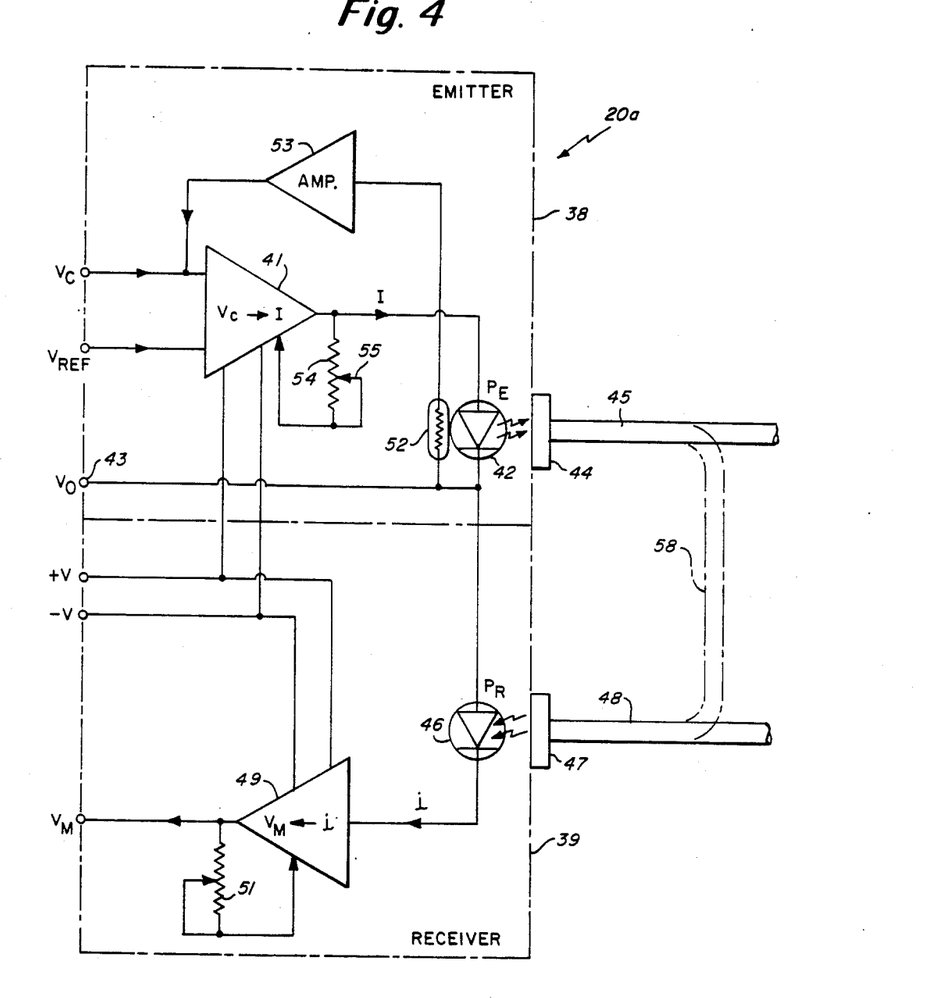
FIG. 4 is a scheme showing one embodiment of the emitting and receiving sections of the apparatus of FIGS. 1 and 3.

As shown in FIG. 4, the drawer 20a is comprised of an emitting component 38 and a receiving component 39. The emitter part 38 contains a voltage/current converter 41 which at a first input receives the above control voltage $v_c$ originating from the processing unit 37 via the modulator 32 and at a second input a continuous reference voltage $V_{REF}$ originating from the feed drawer 19. The voltage $V_{REF}$ is a stabilized voltage furnished, e.g., by a Zener diode. The output of the voltage/current converter 41 is connected to the anode of a light-emitting diode 42, the cathode of which is connected to a terminal 43 which is located at a reference level $V_O$, e.g., the electric ground of the apparatus. The diode 42 is coupled optically by an optical connector 44 to an emission optical fiber 45. The fiber 45 can be a fiber to be tested or a source fiber that is a part of the emitting and receiving apparatus and can be connected by a connector (not shown) to a fiber to be tested.

The receiving part 39 contains a photoreceiver 46 that is coupled optically by a connector 47 to a reception optical fiber 48. The photoreceiver 46 has a spectral window covering that of the light-emitting diode 42. The photoreceiver 46 can, for example, be a germanium photodiode or a silicon photodiode, the choice between one or the other type of photodiode being made so as to have the greatest sensitivity to the wavelength of the light emitted by the light-emitting diode 42. For example, if the diode 42 emits light at a wavelength of 820 nm, a silicon photodiode, which has a greater sensitivity than a germanium photodiode at this wavelength, will be preferably chosen as the photoreceiver 46. On the other hand, if the diode 42 emits light with a wavelength of 1300 nm, a germanium photodiode will be taken as the photoreceiver 46. The anode of the photoreceiver 46 is connected to the terminal 43, while its cathode is connected to the input of an amplifier 49, the output of which is connected to the processing unit 37 through the connectors 28 and 31 and the demodulator 33. The gain of the amplifier 49 is set at the factory by means of an adjustable resistance 51, so as to be adapted to the response of the photoreceiver 46 at the wavelength emitted by the diode 42.

As shown in FIG. 4, the voltage/current converter 41 and the amplifier 49 also receive the feed voltages $+V$ and $-V$ originating from the feed drawer 19 through the connectors 28 and 31.

The emitter/receiver drawer 20b has a structure identical to that of the drawer 20a described above. It will simply be noted that the light-emitting diode of the drawer 20b emits light at a wavelength different from that of the light-emitting diode of the drawer 20a, and that the photoreceiver of the drawer 20b is chosen to be the best adapted to the wavelength emitted by the light-emitting diode of the drawer 20b. In addition, the gain of the amplifier of the drawer 20b is set so as to be adapted to the response of the photoreceiver associated with it at the wavelength emitted by the light-emitting diode of the drawer 20b. It will be noted in this respect that the gain of the amplifer 49 of the drawer 20a and the gain of the amplifier of drawer 20b are set so that at identical levels of the light powers respectively emitted by the light-emitting diodes and respectively received by the photoreceivers the two amplifiers deliver output signals having identical levels.

In the emission mode the emission level desired is selected by means of one or the other of the two keys LEVEL 1 and LEVEL 2 of the keyboard 15 (FIG. 1) and the power value selected is displayed on the display 17. The processing unit 37 then sends the voltage/current converter 41 a control voltage $v_c$, which has a first or a second value depending on whether level 1 or level 2 was selected, and whose value can be modified by the user, by means that will be described in detail below, between 0 and the first value or between 0 and the second value, the latter being identical to that of the reference voltage $V_{REF}$. The voltage/current converter 41 produces a current I on its output that is proportional to the control voltage $v_c$ and which, in passing through the light-emitting diode 42, induces the emission of a light power $P_E$ that is proportional to the current I. Thus, if the voltage $v_c$ has the first or the second value, the light power emitted $P_E$ will have the maximum value that can be emitted for the level 1 or the level 2 selected, while if the voltage $v_c$ has a zero value, the light power emitted $P_E$ will be zero. For example, assuming that the light-emitting diode 42 of the drawer 20a emits light at a wavelength of 820 nm, the light power emitted $P_E$ can vary from 0 to 2 $\mu$W for level 1 and from 0 to 20$\mu$W for level 2. Likewise, assuming that the light-emitting diode of the drawer 20b emits light at a wavelength of 1300 nm, the light power emitted $P_E$ could vary from 0 to 1 $\mu$W for level 1 and from 0 to 10 $\mu$W for level 2.

When the "sound" function or the "external modulation" function is activated by the SOUND key of keyboard 15 or by the commutator 12, respectively, the control voltage $V_c$ can be modulated in amplitude by means of the modulator 32, either by the output signal of the microphone 7 amplified by the amplifier 34, or by an external modulation signal applied to the terminal 5. In this case, an amplitude-modulated light signal is obtained on the emission optical fiber 45.

In the reception mode, the light power $P_R$ received from the reception optical fiber 48 is applied to the photoreceiver 46. This induces the passage of a current i through the photoreceiver 46, a current that is proportional to the light power received $P_R$ and which is converted by the amplifier 49 into a measuring voltage $V_M$ that is itself proportional to the current i, thus to the light power received $P_R$. The measuring voltage $V_M$ is sent to the processing unit 37 through the demodulator 33. Thus, in the case where the light flux received by the photoreceiver 46 is amplitude-modulated (sound signal, for example), the modulation signal could be recovered either on the analog output terminal 6 or, after amplification by the amplifier 35, on the loudspeaker 8. With regard to the measurement of the light power received $P_R$ in watts or dBm, the processing unit 37 processes the measuring voltage $V_M$ and sends the indication corresponding to the measurement on the display 17 and toward the signalization diodes according to the range selected by means of the keyboard 15, the range commutations, ratio calculations and logarithmic conversions being effected in a conventional manner by the microprocessor of the processing unit 37.

In the mode of measuring the attenuation on a single fiber, the emitting and receiving apparatus function is relooped on itself by the fiber to be tested, the ends of the fiber being coupled optically to the light-emitting diode 42 and the photoreceiver 46, respectively. In this case, the light power emitted is the maximum power that can be emitted on one or the other of the two emission levels, the attenuation calculation then being effected by the microprocessor of the processing unit 37 with respect to the maximum level selected.

In the emission mode and in the attenuation measurement mode, the setting of the level of the light power emitted by the light-emitting diode 42 at the value desired by the user is based on the perfect linearity of the transfer function (power emitted as a function of the direct polarization current) of the light-emitting diode 42. The temperature variations in the diode 42 due to its self-heating and/or variations in the ambient temperature induce a nonlinearity that affects the light power level effectively emitted by the diode 42. As shown in FIG. 4, it is possible to resolve this problem by providing a temperature compensation circuit in the emitting portion 38 of each emitting/receiving drawer. This circuit contains a temperature pickup 52, e.g., a thermistance that is thermally coupled to the light-emitting diode 42 and which furnishes a signal the value of which is a function of the temperature of the said diode. The signal furnished by the temperature pickup 52 is amplified by an amplifier 53 so as to produce a counter reaction that is algebraically summed to the control voltage $v_c$ at the input of the voltage/current converter 41 so as to retroact on the direct polarization current I of the diode 42 according to a law that permits maintaining a practically constant emitted light power $P_E$ in spite of the temperature variations of the diode 42.

Besides the temperature deviation in the light-emitting diode 42, there are other error factors that affect the level of power actually emitted in the optical fiber to be tested. These other error factors are, for example, variation in the reference voltage $V_{REF}$, the aging of the light-emitting diode, the losses in the connectors coupling the optical fibers to the light-emitting diode and to the photoreceiver. If one wishes to determine precisely the attenuation of an optical fiber equipped with its connectors, without including the losses due to coupling to the light-emitting diode and to the photoreceiver, the power effectively emitted in the connector of the fiber to be tested must be assured. For this purpose, each of the emitting/receiving drawers 20a and 20b has a calibration device. As shown in FIG. 4, the calibration device is comprised of an adjustable resistance 54, the ends of which are connected respectively to the output and a gain control input of the voltage/current converter 41, for adjusting the gain. The cursor 55 of the adjustable resistance 54 is connected mechanically to a control button 56, which is provided for example with a slot that is accessible with the aid of a screw driver through a hole 57 in the front face of each of the two drawers 20a and 20b as shown in FIG. 1. The calibration is achieved by relooping the light-emitting diode 42 on the photoreceiver 46 with the aid of a short section of optical fiber 58 (shown with dot-dash lines in FIGS. 3 and 4) equipped with connectors identical to the connectors 44 and 47 of the fiber for which the attenuation is to be measured. The calibration is then effected by acting on the gain of the voltage/current converter 41 with the aid of the adjustable resistance 54 so that the apparatus, operating in attenuation measurement with the maximum power level that can be emitted taken as the reference, indicates a relative attenuation of 0 dBr. Having thus effected the calibration, it is sufficient to replace the fiber 58 with the one for which one wishes to measure the attenuation.

Figure 5:
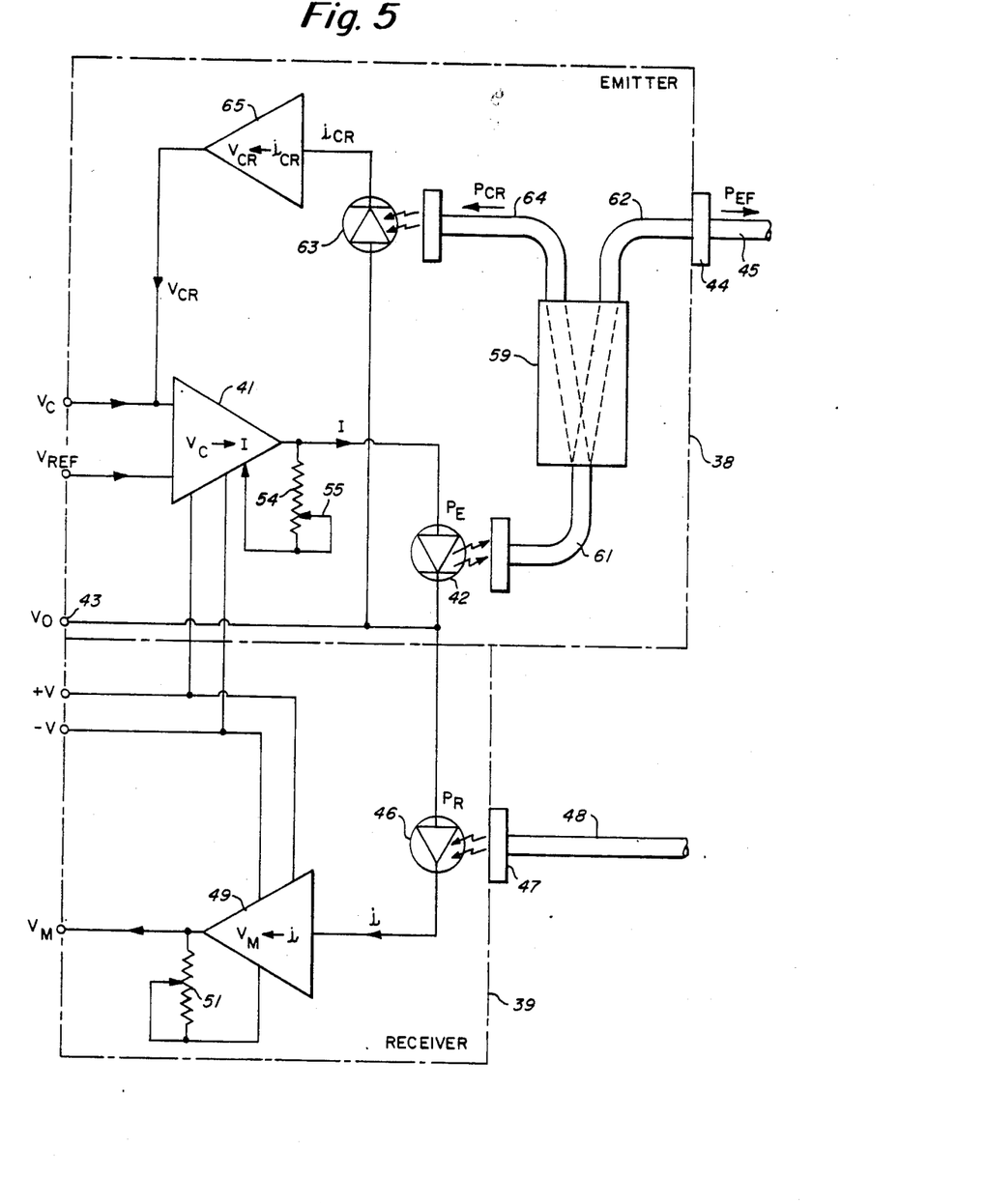
FIG. 5 is a scheme similar to that of FIG. 4, showing another embodiment of the emitting and receiving sections.

FIG. 5 shows another embodiment of the emitting/receiving drawer that permits obtaining a perfectly determined and stable emitted light power in spite of the drifts in the emitting diode due to its aging and to temperature variations. In the embodiment of FIG. 5, the receiving part 39 of the drawer is identical to that shown in FIG. 4. The emitting part 38 differs from that shown in FIG. 4 by the absence of the temperature pickup 52 and the amplifier 53. Instead of these elements, it is provided with a Y-shaped optical coupler 59, the input of which is coupled optically with the light-emitting diode 42 by a short optical fiber 61. The coupler 59 has a first output that is coupled optically with the source fiber or emission fiber 45 by a short optical fiber 62 and by the connector 44, and a second output that is coupled optically to a photoreceiver 63 by a short optical fiber 64. The anode of the photoreceiver 63 is connected to the terminal 43 and its cathode is connected to the input of a current/voltage converter 65, whose output is connected to the control input of the voltage/current converter 41. In the emission mode, the coupler 59 receives the light power $P_E$ emitted by the diode 42 and it injects into the fiber 45 a light power $P_{EF}$ whose value is a predetermined fraction of the power $P_E$, this fraction representing a major portion of the power $P_E$. Simultaneously, the coupler 59 injects a small predetermined fraction $P_{CR}$ of the power emitted $P_E$ into the fiber 64 toward the photoreceiver 63. The photoreceiver 63 generates a current $i_{CR}$ that is proportional to the power $P_{CR}$ and this current is converted by the converter 65 into a voltage $v_{CR}$ that is added to the control voltage $v_c$. The resulting voltage then controls the voltage/current converter 41 so that the power effectively emitted $P_{EF}$ in the fiber 45 is constant and equal to the value desired.

Figure 6:
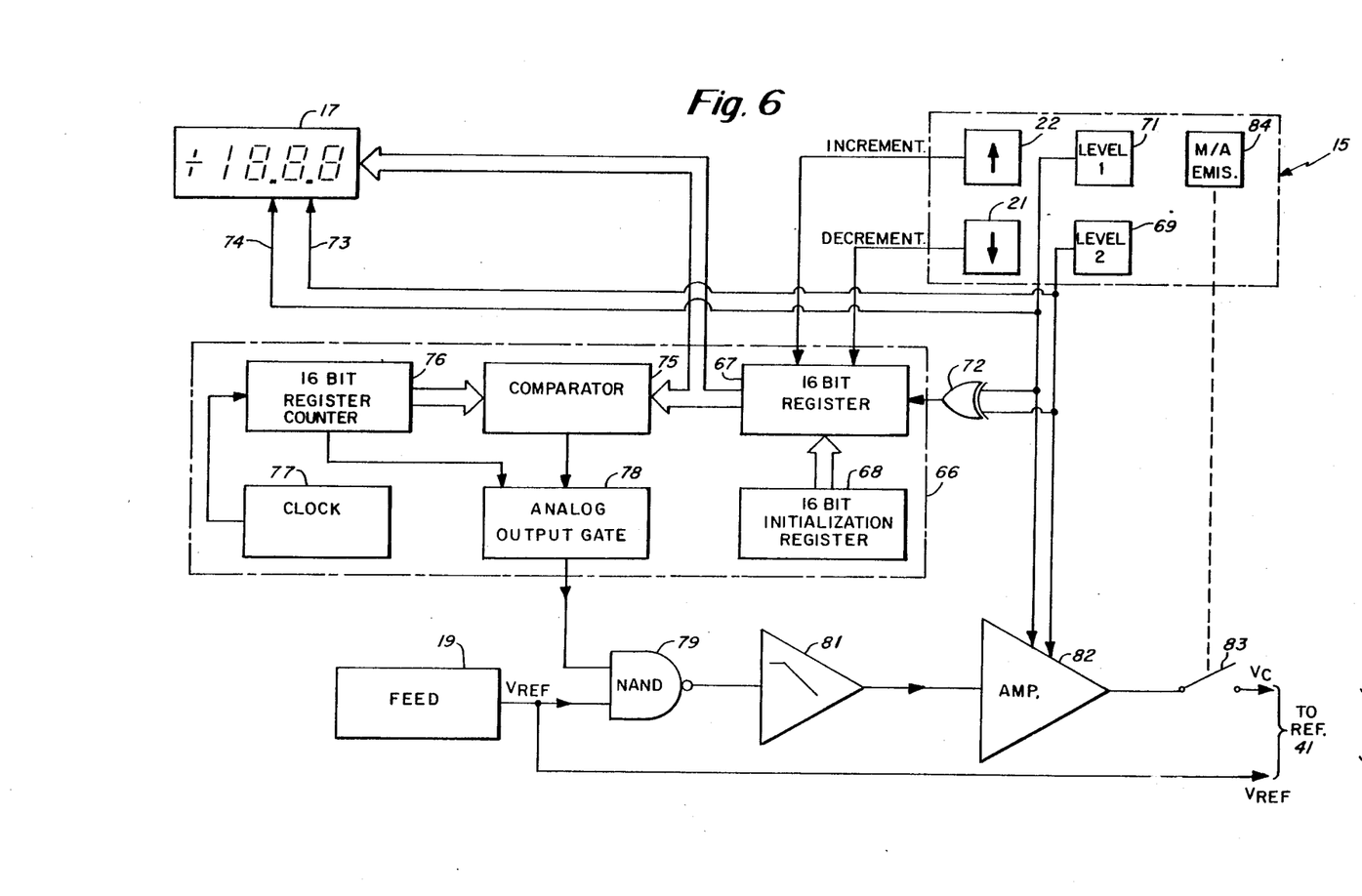
FIG. 6 is a block diagram of another part of the apparatus of FIGS. 1-3 in greater detail.

As indicated above, the light power emitted can be regulated between a zero value and a maximum value corresponding to each of two power levels capable of being selected (LEVEL 1 and LEVEL 2) by varying the control voltage $v_c$. This permits measuring the linearity, detection threshold and the saturation threshold. This is facilitated by the fact that each emitting/receiving drawer is capable of furnishing a perfectly determined and stable light power due to the temperature compensation circuit (52, 53, FIG. 4) or to the closed-loop control circuit (59, 63, 64, 65, FIG. 5) associated with each light-emitting diode 42. FIG. 6 shows an arrangement of circuits that permit varying the control voltage $v_c$. As shown in FIG. 6, the microprocessor 66 of the processing unit contains a 16-bit register 67 which during the starting of the apparatus is charged with a value preregistered in a 16-bit initialization register 68 and which represents a maximum emissible light power. The contents of the register 67 can be selectively decremented and incremented between 0 and the said predetermined value in response to the actuation of a key 21 and a key 22, respectively, of the keyboard 15. Incrementation and decrementation of the contents of register 67 are validated by the actuation of one or the other of two keys 69 and 71 of the keyboard 15, which are connected to a validation input of the register 67 through an exclusive-or gate 72. The key 69 is the key that permits selecting the level 2 corresponding to the maximum light power that can be emitted by the light-emitting diode 42, e.g., 20 $\mu$W for the emitting/receiving drawer 20a, and the key 71 is the key that permits selecting the level 1 corresponding to one-tenth of the maximum light power that can be emitted by the light-emitting diode 42, e.g., 2 $\mu$W. The display 17 is connected to the output of the register 67 for displaying the contents. The two keys 69 and 71 are also connected respectively to two decimal point-positioning inputs 73 and 74 of the display so that, for the same value of the contents of the register 67, the display 17 displays a value when the key 71 is actuated that is one-tenth the value displayed when the key 69 is actuated.

The content of register 67 is compared in synchronous regime by means of a comparator 75 with the content of a 16-bit counter 76. The content of counter 76 evolves cyclically under the control of a clock 77. The output of the comparator 75 and the overflow output of the counter 76 are connected to an analog output gate 78 of the microprocessor 66. When the contents of register 67 and counter 76 are identical, the comparator 75 emits a signal at its output that induces the logic state "1" of the gate 78. At the end of each counting cycle of the counter 76, the latter emits on its overflow output an overflow signal that causes the gate 78 to reset to zero. The latter thus behaves as a bistable rocker that is placed in the state 1 by the output of comparator 75 and which is reset to zero by the overflow output of the counter 76. The output of gate 78 is connected to one of two inputs of a NAND gate 79, the other input of which receives the reference voltage $V_{REF}$ originating from the feed 19. Designating the duration of a counting cycle of the counter 76 by T, a rectangular signal is thus obtained at the output of the NAND gate 79 that has a fixed frequency F=1/T and an impulse width proportional to the value of the content of register 67, thus proportional to the power level desired. This rectangular output signal is integrated by an integrator 81, comprised for example of a low-pass filter, in order to obtain a continuous voltage whose amplitude is proportional to the width of the impulses of the rectangular signal. This continuous voltage is amplified by an amplifier 82 with commutable gain. The value of the gain of the amplifier 82 is modified in response to actuation of one or the other of the two keys 69 and 71. More precisely, when the key 69 is actuated, the gain of the amplifier 82 has a first value and when the key 71 is actuated, it has a second value that is one-tenth the first value. The first value of the gain is chosen so that the voltage $v_c$ obtained at the output of the amplifier 82 is identical to the reference voltage $V_{REF}$ when the width of the impulses of the rectangular signal at the output of the gate 79 is equal to the duration T of the counting cycle, in other words, when the content of register 67 has its maximum value corresponding to the content of the initialization register 68. Thus, by simultaneously actuating the key 69 and one or the other of the two keys 21 and 22, the voltage $v_c$ will vary between 0 and $V_{REF}$, while by simultaneously actuating the key 71 and one or the other of the two keys 21 and 22, the voltage $v_c$ will vary between 0 and $V_{REF}/10$.

The output of the amplifier 82 is connected to the control input of the voltage/current converter 41 via the modulator 32 and the connectors 28 and 31 of FIG. 3, through a switch 83, which is closed in response to the actuation of the key 84 (M/A EMISSION) of the keyboard 15.

It is understood that the embodiments of the present invention that were described above were presented as purely indicative and nonlimiting examples and that numerous modifications can be made by the technician without departing from the scope of the present invention. Although the emitting and receiving apparatus described above has only two removable emitting/receiving drawers 20a and 20b, it is clear that other removable emitting/receiving drawers can be used, either lodged in the case or insertable in it in place of one of the two drawers 20a and 20b, and operating at wavelengths different from those of these two drawers.

We claim:

1. Multi-wavelength light emitting and receiving apparatus for monitoring connections by optical fibers, comprised of a case (1a, 1b), an emission section (38) containing a closed-loop controlled current source (41) and at least one light-emitting diode (42) connected to the closed-loop controlled current source, a receiving section (39) containing a photoreceiver (46), having a spectral window covering that of the light-emitting diode, and and amplifier (49) connected to the output of the photoreceiver, a keyboard (15) for selecting the operating modes and the measurement scales, a display device (17), a processing unit (37) with a microprocessor (66) connected to the closed-loop controlled current source of the emission section, to the amplifier of the receiving section, to the keyboard and to the display device, and a feed (19) capable of furnishing the continuous voltages necessary for the functioning of the apparatus, characterized in that the light-emitting diode (42), the closed-loop controlled current source (41), the photoreceiver (46) and the amplifier (49) are mounted in a drawer (20a) equipped with a connector (28) that can be inserted in a complementary connector (31) provided in the case, this latter containing the keyboard (15), the display device (17), the processing unit (37) and the feed (19), in that it also includes at least one more drawer (20b) provided with a connector that can be inserted into the said complementary connector (31) of the case and containing another closed-loop controlled current source, another light-emitting diode having an emission wavelength different from that of the first light-emitting diode and connected to the other closed-loop controlled current source, another photoreceiver having a spectral window covering that of the other light-emitting diode, and another amplifier connected to the output of the other photoreceiver, and in that each amplifier has a gain adapted to the response of the photoreceiver associated with it at the wavelength emitted by the emitting diode situated in the corresponding drawer, such that at identical levels of light power respectively emitted by the emitting diodes and respectively received by the photoreceivers the amplifiers deliver output signals having identical levels.

2. Apparatus according to claim 1, characterized in that each source of closed-loop control current (41) is comprised of a voltage/current converter controlled by the voltage, having a first input receiving a reference voltage ($V_{REF}$), a second input receiving a control voltage ($V_c$) and an output connected to the light-emitting diode (42).

3. Apparatus according to claim 2, characterized in that each drawer (20a or 20b) also contains an adjustable calibration resistance (54), the ends of which are connected respectively to the output and to a gain control input of the voltage/current converter (41).

4. Apparatus according to claims 2 or 3, characterized in that each drawer (20a or 20b) also contains a temperature detector (52) thermally coupled to the light-emitting diode (42) and an amplifier (53), the input of which is connected to the temperature detector and the output to the second input of the voltage/current converter (41).

5. Apparatus according to claims 2 or 3, characterized in that each drawer (20a or 20b) also contains a Y-shaped optical coupler (59) having an input optically coupled to the light-emitting diode (42) by a first optical fiber (61), a first output optically coupled to an optical source fiber (62), and a second output, a photoreceiver (63) optically coupled to a second output of the Y-shaped optical coupler (59) by a second optical fiber (64), and a current/voltage converter (65), the input of which is connected to the photoreceiver (63) and the output to the second input of the voltage/current converter (41).

6. Apparatus according to any one of claims 2-5, characterized in that the processing unit (37) contains means (66, 79, 81, 82) connected to the second input of the voltage/current converter (41) and capable of producing a continuous control voltage ($V_c$) variable between 0 and a value identical at the most to the value of the reference voltage ($V_{REF}$) applied to the first input of the voltage/current converter (41).

7. Apparatus according to claim 6, characterized in that the said means that produce the variable continuous control voltage have an initialization register (68) containing a pre-registered value representing a maximum emissible light power, a register (67) that is connected to the initialization register so as to be charged by the latter during start-up of the apparatus, and whose contents can be selectively decremented and incremented between 0 and the said preregistered value in response to the actuation of a first and a second key (21 and 22) of the keyboard (15), respectively, a clock (77), a counter (76), the counting input of which is connected to the clock, a comparator (75) whose inputs are connected respectively to the output of the register (67) and to the output of the counter (76), an analog output gate (78) having a first input connected to the output of the comparator and a second input connected to an overflow output of the counter (76), an ET-NON gate (79) having a first input connected to the output of the analog output gate (78) and a second input connected to the feed (19), an integrator (81) connected to the output of the ET-NON gate (79) and an amplifier (82) whose input is connected to the output of the integrator and whose output is connected to the second input of the voltage/current converter (41), the display device (17) being connected to the output of the register (67).

8. Apparatus according to claim 7, characterized in that the amplifier (82) is a commutable-gain amplifier, the amplifier gain having a first value in response to the actuation of a third key (69) of the keyboard (15) and a second value that is one-tenth of the first value in response to the actuation of a fourth key (71) of the keyboard (15), the third and fourth keys (69 and 71) being connected to two decimal point-positioning inputs (73 and 74), respectively, of the display device (17) and, through an exclusive or gate (72), to a validation input of the register (67).

* * * * *